US007483765B2

(12) United States Patent
Dick et al.

(10) Patent No.: US 7,483,765 B2
(45) Date of Patent: Jan. 27, 2009

(54) GAUGE SYSTEM

(75) Inventors: Spencer B. Dick, Portland, OR (US); Stuart R. Aldrich, Portland, OR (US); David A. Morgan, Portland, OR (US); Robert P. Hodges, Portland, OR (US); Simon A. Soot, Portland, OR (US); Jody S. Carpenter, Portland, OR (US); John S. Gorny, Portland, OR (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 11/711,497

(22) Filed: Feb. 26, 2007

(65) Prior Publication Data

US 2008/0009961 A1 Jan. 10, 2008

Related U.S. Application Data

(60) Provisional application No. 60/776,283, filed on Feb. 24, 2006.

(51) Int. Cl.
*G06F 19/00* (2006.01)
*B26D 7/06* (2006.01)

(52) U.S. Cl. ........................................ 700/186; 83/446

(58) Field of Classification Search ................. 700/186, 700/192; 83/438–450
See application file for complete search history.

(56) References Cited

U.S. PATENT DOCUMENTS

| | | | |
|---|---|---|---|
| 491,307 | A | 2/1893 | Gaylord |
| 1,271,473 | A | 7/1918 | Johnson |
| 2,315,458 | A | 3/1943 | Sellmeyer |
| 2,577,766 | A | 12/1951 | Johnson et al. |
| 2,602,477 | A | 7/1952 | Kniff |
| 2,731,989 | A | 1/1956 | Valcourt et al. |
| 2,740,437 | A | 4/1956 | Odlum et al. |
| 2,852,049 | A | 9/1958 | Peterson |
| 3,170,736 | A | 2/1965 | Wright |
| 3,186,453 | A | 6/1965 | Green |
| 3,329,181 | A | 7/1967 | Buss et al. |
| 3,459,246 | A | 8/1969 | Ottosson |
| 3,566,239 | A | 2/1971 | Taniguchi |
| 3,584,284 | A | 6/1971 | Beach |
| 3,736,968 | A | 6/1973 | Mason |
| 3,738,403 | A | 6/1973 | Schwoch |
| 3,780,777 | A | 12/1973 | Davies |
| 3,811,353 | A | 5/1974 | Miles |
| 3,814,153 | A | 6/1974 | Schmidt |
| 3,841,462 | A | 10/1974 | Schmidt |
| 3,854,889 | A | 12/1974 | Lemelson |
| 3,886,372 | A | 5/1975 | Sanglert |
| 3,917,078 | A | 11/1975 | Schmidt |

(Continued)

OTHER PUBLICATIONS

"TigerStop Application Guide". Application Guide for PF90 Computer Controlled Saw, Precision Automation Inc. 2005.

*Primary Examiner*—M. N. Von Buhr
(74) *Attorney, Agent, or Firm*—Kolisch Hartwell, P.c.

(57) ABSTRACT

Gauge system, including methods and apparatus, for positioning workpieces to be processed. In some embodiments, the gauge system may have a plurality of stops for positioning the end of a workpiece at distinct distances from a processing station. In some embodiments, the plurality of stops may be arrayed along a rail assembly having an adjustable length.

23 Claims, 5 Drawing Sheets

U.S. PATENT DOCUMENTS 3,941,019 A 3/1976 Baldwin et al.
3,994,484 A 11/1976 Schorr
4,055,097 A 10/1977 Ducret
4,111,088 A 9/1978 Ziegelmeyer
4,144,449 A 3/1979 Funk et al.
4,221,974 A 9/1980 Mueller et al.
4,260,001 A 4/1981 De Muynck
4,286,880 A 9/1981 Young
4,358,166 A 11/1982 Antoine
4,410,025 A 10/1983 Sicotte
4,434,693 A 3/1984 Hosoi
4,453,838 A 6/1984 Loizeau
4,454,794 A 6/1984 Thornton
4,469,318 A 9/1984 Slavic
4,472,783 A 9/1984 Johnstone et al.
4,499,933 A 2/1985 Thompson
4,541,722 A 9/1985 Jenks
4,596,172 A 6/1986 Visser
4,658,687 A 4/1987 Haas et al.
4,694,871 A 9/1987 Jenkner
4,725,961 A 2/1988 Pearl
4,736,511 A 4/1988 Jenkner
4,791,757 A 12/1988 Orlando
4,805,505 A 2/1989 Cantlin
4,830,075 A 5/1989 Jenkner
4,874,996 A 10/1989 Rosenthal
4,878,524 A 11/1989 Rosenthal et al.
4,879,752 A 11/1989 Aune et al.
4,901,992 A 2/1990 Dobeck
4,939,739 A 7/1990 Hobart et al.
5,001,955 A 3/1991 Fujiwara
5,042,341 A 8/1991 Greten et al.
5,054,938 A 10/1991 Ide
5,058,474 A 10/1991 Herrera
5,094,282 A 3/1992 Suzuki et al.
5,142,158 A 8/1992 Craig, Jr.
5,176,060 A 1/1993 Thornton
5,197,172 A 3/1993 Takagi et al.
5,201,258 A 4/1993 Cremona
5,201,351 A 4/1993 Hurdle, Jr.
5,251,142 A 10/1993 Cramer
5,254,859 A 10/1993 Carman et al.
5,266,878 A 11/1993 Makino et al.
5,365,812 A 11/1994 Harnden
5,418,729 A 5/1995 Holmes et al.
5,443,554 A 8/1995 Robert
5,444,635 A 8/1995 Blaine et al.
5,460,070 A 10/1995 Buskness
5,472,028 A 12/1995 Faulhaber
5,489,155 A 2/1996 Ide
5,524,514 A 6/1996 Hadaway et al.
5,663,882 A 9/1997 Douglas
5,664,888 A 9/1997 Sabin
RE35,663 E 11/1997 Mori et al.
5,772,192 A 6/1998 Hoffmann
5,797,685 A 8/1998 Jurik et al.
5,798,929 A 8/1998 Stenzel et al.
5,829,892 A 11/1998 Groves
5,845,555 A * 12/1998 Dawley .................... 83/467.1
5,865,080 A 2/1999 Jackson
5,933,353 A 8/1999 Abriam et al.
5,938,344 A 8/1999 Sabin
5,953,232 A 9/1999 Blaimschein
5,960,104 A 9/1999 Conners et al.
5,964,536 A 10/1999 Kinoshita
6,058,589 A 5/2000 Hakansson
6,062,280 A 5/2000 Newnes et al.
6,120,628 A 9/2000 Pritelli
6,144,895 A 11/2000 Govindaraj et al.
6,216,574 B1 4/2001 Hain
6,263,773 B1 7/2001 McAdoo et al.
6,272,437 B1 8/2001 Woods et al.
6,314,379 B1 11/2001 Hu et al.
6,379,048 B1 4/2002 Brissette
6,390,159 B1 5/2002 Pinske
6,422,111 B1 7/2002 Rousseau
6,463,352 B1 10/2002 Tadokoro et al.
6,470,377 B1 10/2002 Sevcik et al.
6,510,361 B1 1/2003 Govindaraj et al.
6,520,228 B1 2/2003 Kennedy et al.
6,549,438 B2 4/2003 Malone
6,594,590 B2 7/2003 Woods et al.
6,618,692 B2 9/2003 Takahashi et al.
6,631,006 B2 10/2003 Dick et al.
6,675,685 B2 * 1/2004 Ceroll et al. .................. 83/438
6,690,990 B1 2/2004 Caron et al.
6,701,259 B2 3/2004 Dor et al.
6,735,493 B1 5/2004 Chou et al.
6,764,434 B1 7/2004 Volk
6,886,462 B2 5/2005 Dick et al.
6,898,478 B2 5/2005 Dick et al.
7,021,096 B2 * 4/2006 Barnett ....................... 72/31.1
7,073,422 B2 * 7/2006 Dick ......................... 83/468.7
7,168,353 B2 * 1/2007 Dick et al. ..................... 83/23
7,171,738 B2 * 2/2007 Dick et al. .................... 29/563
7,245,981 B2 * 7/2007 Dick et al. .................. 700/167
2003/0033920 A1 * 2/2003 Parks et al. ................... 83/440
2004/0027038 A1 2/2004 Gaesser et al.
2004/0154449 A1 * 8/2004 Parks et al. ................ 83/477.2
2006/0104551 A1 * 5/2006 Schneeberger et al. ........ 384/26
2007/0084323 A1 * 4/2007 Parks et al. ................ 83/468.3
2007/0245872 A1 * 10/2007 Kelly .......................... 83/581

* cited by examiner

GAUGE SYSTEM

CROSS-REFERENCE TO PRIORITY APPLICATION

This application claims priority under 35 U.S.C. § 119(e) to U.S. Provisional Patent Application Ser. No. 60/776,283, filed Feb. 24, 2006, which is incorporated herein by reference in its entirety for all purposes.

CROSS-REFERENCES TO RELATED MATERIALS

This application incorporates by reference the following U.S. patents: U.S. Pat. Nos. 4,596,172; 4,901,992; 5,042,341; 5,444,635; 5,960,104; 6,216,574; 6,631,006; 6,886,462; 6,898,478; 6,941,864; 7,080,431; 7,168,353; and U.S. Pat. No. 7,171,738.

This application also incorporates by reference the following U.S. provisional patent application: Ser. No. 60/839,661.

This application also incorporates by reference the following U.S. patent applications: Ser. Nos. 10/645,827; 10/897,997; 10/958,690; 11/140,541; and 11/492,703.

BACKGROUND

Automated gauge systems may facilitate positioning workpieces, such as stock lumber, relative to a saw. An operator inputs a desired length of a product, and the system automatically positions a stop (e.g., a fence) such that the stop is spaced from the saw by the desired length. Accordingly, a workpiece abutted at its end against the stop and properly aligned with a rail can be positioned quickly and accurately for sawing to create the product.

In order to position the stop for both long and short products, the system may have a relatively long drive mechanism that drives movement of the stop. For example, a gauge system that can cut lumber to generate products of up to ten feet in length may have a drive mechanism and a rail that are both about ten feet long. The drive mechanism and rail thus may restrict the portability, storability, and/or maximum product length of the gauge system.

SUMMARY

The present teachings provide a gauge system, including methods and apparatus, for positioning workpieces to be processed. In some embodiments, the gauge system may have a plurality of stops for positioning the end of a workpiece at distinct distances from a processing station. In some embodiments, the plurality of stops may be arrayed along a rail assembly having an adjustable length.

DETAILED DESCRIPTION

The present teachings provide a gauge system, including methods and apparatus, for positioning workpieces to be processed. The gauge system may have a rail with selectable stops. Alternatively, or in addition, the rail may have an extended (or longer) working configuration and a more compact (or shorter) storage configuration, for example, configurations created, respectively, by connecting and disconnecting frame sections of the rail. In some embodiments, the gauge system may have a drive mechanism with a range of travel substantially less than the measurement range of the system. Overall, the gauge systems of the present teachings may offer improved portability and/or storability, and/or a more compact drive mechanism, among others.

Figure 1:
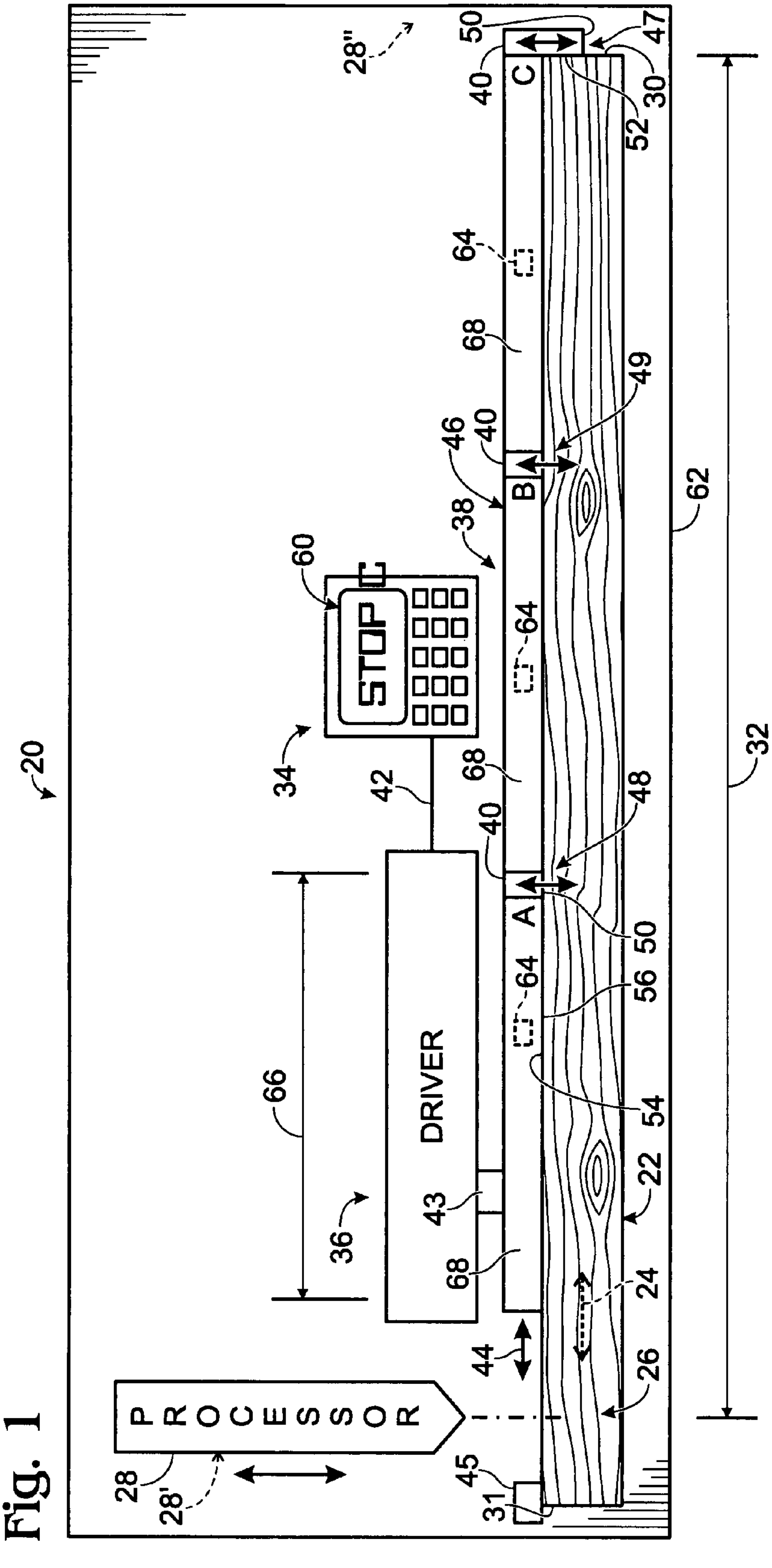
FIG. 1 is a top view of an exemplary gauge system for positioning workpieces to be processed, in accordance with aspects of the present teachings.

FIG. 1 shows an exemplary gauge system 20 for positioning workpieces to be processed. System 20 may be a linear gauge that enables linear positioning of a workpiece 22 along a positioning axis 24 such that one or more sites 26 along the workpiece are selected for modification by a workpiece processor 28 (and, optionally, 28' and/or 28"), such as a saw or drill, among others, disposed at a processing station(s). In particular, the linear gauge may dispose the workpiece with a trailing end 30 (or a leading end 31) of the workpiece at a desired spacing or linear dimension/distance 32 from workpiece processor 28. In some embodiments, the gauge system may include a plurality of workpiece processors. For example, the system may include workpiece processor 28 and an additional workpiece processor 28' both disposed adjacent the same end of the driver. Alternatively, or in addition, the system may include workpiece processor 28 and an additional workpiece processor 28" that flank the driver downstream and upstream of opposing ends of the driver.

System 20 may accomplish positioning via a controller 34, a driver (a drive mechanism) 36, and a rail assembly (a rail) 38 carrying two or more stops 40 (here, stops labeled as A-C). The, controller may be in communication, indicated at 42, with the driver for operation of the driver. The driver may be mechanically coupled to the rail assembly and/or the stops, for example, via a coupling arm 43 or other coupling structure. Accordingly, the controller may control movement, indicated at 44, of the rail assembly and/or stops parallel to positioning axis 24, by sending control signals to the driver. In particular, the controller may receive one or more user inputs or signals related to workpiece processing, such as desired processing sites relative to workpiece ends, a cut list (e.g., the length (and, optionally, the number) of products to be produced), defect position(s), the length of the current workpiece and/or of stock to be used, etc. Then, based on the inputs, the controller may operate the driver so that the rail assembly and/or stops are moved appropriately. The rail assembly and/or stops may be moved before and/or after the workpiece is aligned with the rail assembly (and/or engaged with a stop). In some embodiments, the system also may include a secondary or fixed rail 45 that is aligned with movable rail assembly 38 and disposed upstream or downstream of the movable rail assembly, such as positioned on the other side of workpiece processor 28, as shown here.

Stops 40 may be structured for alternative engagement of the workpiece's end at discrete locations along the positioning axis. The stops thus may be arrayed along a rail frame 46 of the rail assembly, generally at predefined axial positions of the rail frame. In addition, each stop may be movable relative to the rail frame, indicated here by double-headed motion arrows oriented orthogonally to processing axis 24. Each stop may have a deployed or working configuration, indicated at 47 for stop C. Some or all of the stops also may have a retracted configuration, indicated at 48 and 49, respectively, for stops A and B. Stops may be movable when urged toward the rail frame, such as by engagement with a retraction surface 50 of a stop (see stop A). However, stops may remain static or fixed in position when urged parallel to the rail frame (i.e., parallel to the positioning axis), such as when engaged via a stop surface 52 of the stop. Workpiece 22 thus may be aligned with the rail frame, such as manually, by abutment of a side 54 of the workpiece with a side surface 56 of the rail frame and/or with retraction surface 50 of one or more retracted stops (e.g., stops A and B in the present illustration). Furthermore, trailing end 30 of the workpiece may be engaged with the stop surface of a stop (e.g., stop C in the present illustration) to position the workpiece end along the positioning axis.

Controller 34 may control positioning of the rail assembly according to which stop is selected for axial positioning of the workpiece. The stop may be selected by a user and communicated to the controller and/or the stop may be selected by the controller and communicated to the user, such as stop identity indicated on a display 60 ("STOP C"). (The stop selected by a user also may be marked adjacent the stop by the user or via a signal from the controller, or indicated on the controller display as a reminder to the user.)

The gauge system may include any suitable support(s) to support and/or guide system components. For example, the guide system may include a support platform 62, such as a table (e.g., a folding table), to support and/or hold the processor, driver, controller, workpieces, and/or rail assembly. Furthermore, the gauge system may include one or more guides 64 to direct longitudinal movement of the rail assembly and/or stops, for example, by restricting lateral movement of the rail assembly (such as horizontal and/or upward movement transverse to the positioning axis).

Driver 36 may have a linear range of travel, indicated at 66, that is substantially shorter than the length of the rail assembly and/or the array of stops. In particular, a sufficient range of travel may be approximately the distance between adjacent stops, because this range of travel allows stops to be positioned at a continuous range of locations corresponding to the collective range of travel of all the stops. For example, if the driver has a range of travel of about two feet, and is coupled to a rail assembly with an array of four stops with adjacent stop pairs spaced by two feet, the positioning range of all the stops may be about eight feet (four stops multiplied by two feet/stop). Accordingly, the driver may be constructed to be substantially shorter that the rail assembly. The rail assembly thus may provide the largest linear dimension of the system in its working configuration (or the rail assembly may provide the second largest linear dimension with the support platform being longest). To facilitate storage, shipping, and/or portability, the rail assembly further may have a storage configuration that is substantially shorter and/or more compact than its working (operating) configuration. For example, the rail assembly may include a plurality of frame sections or modules 68. The sections/modules may be assembled lengthwise, generally end to end and aligned with each other, into an extended linear arrangement. The sections/modules also may be disassembled or moved from the extended and/or linear arrangement. More generally, the rail assembly may be converted from its storage configuration to its operating configuration by connecting frame sections to each other, by unfolding a folded rail assembly, and/or by telescoping nested frame sections.

FIGS. 2-5 show another exemplary gauge system 80 for positioning workpieces, such as board 82, for cutting by a saw 84. System 80 may be constructed with many of the features described above for system 20 of FIG. 1, including a rail assembly with stops A, B, and C. The processing of board 82 shown in FIGS. 2-5 may be performed consecutively, for example, to produce a collection of products from the board, and/or may represent alternative processing configurations to produce only one (or at least less than all) of the products. For simplification, the processing configurations of FIGS. 2, 3, and 5 have the rail assembly at the same longitudinal position.

Figure 2:
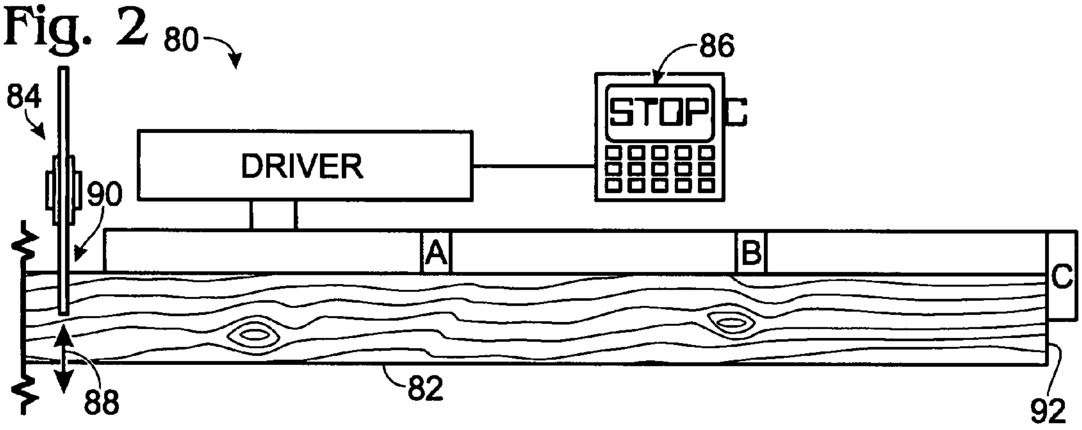
FIGS. 2-5 are top views of another exemplary gauge system for positioning workpieces to be sawed, with a workpiece disposed at various positions along a positioning axis of the system, in accordance with aspects of the present teachings.

FIG. 2 shows board 82 positioned axially by engagement with stop C. Stops A and B are retracted and a display 86 of the controller indicates the stop selected for use (e.g., the stop selected by the controller and/or by a user of the system). Saw 84 may move transversely, indicated at 88, to produce a cut 90 that is relatively far from an engaged end 92 of the board.

Figure 3:
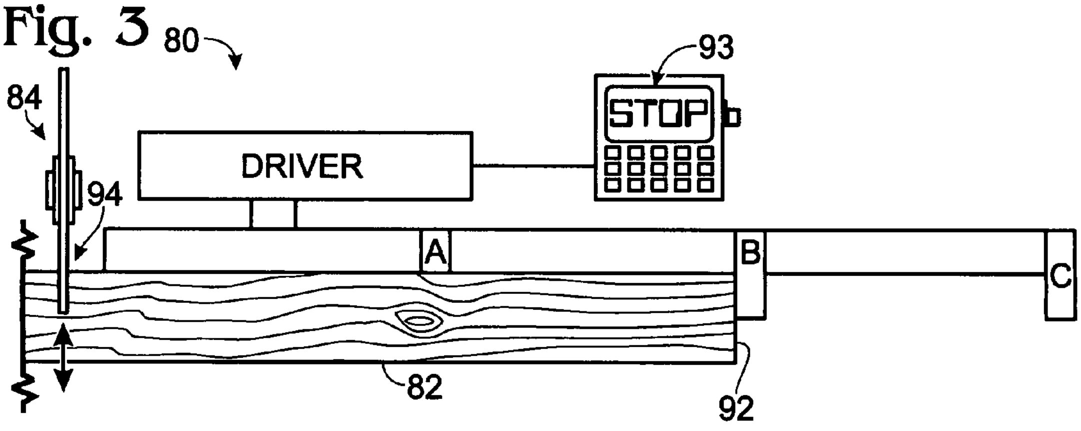

FIG. 3 shows board 82 positioned axially by engagement with stop B. Selection of stop B by the controller and/or user is displayed by the controller at 93. The board may be sawed, indicated at 94, to produce a shorter product and/or to cut the board closer to end 92 than in FIG. 2.

Figure 4:
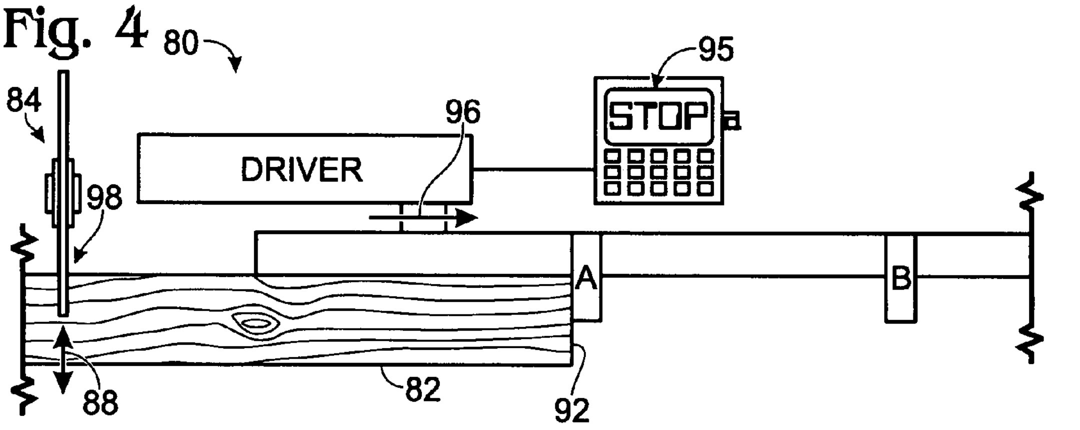
Figure 5:
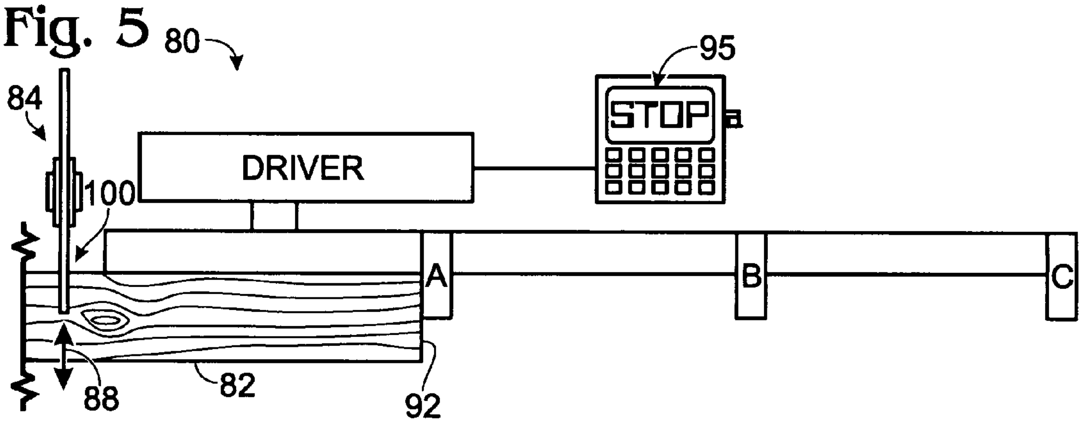

FIGS. 4 and 5 show board 82 positioned axially by engagement with stop A disposed at two distinct axial positions. Selection of stop A by the controller and/or the user is displayed at 95. In FIG. 4, the driver has moved the rail assembly farther away from the saw, relative to FIG. 3, indicated by an arrow at 96. The board may be sawed, indicated at 98 and 100, respectively, to produce even shorter products and/or to cut the board closer to end 92 than in FIGS. 2 and 3. In general, a workpiece may be sawed repeatedly by engaging the end of the workpiece successively with the same stop and/or with different stops disposed progressively closer to the saw station.

Further aspects of the present teachings are described in the following sections, include (I) rails and stops, (II) drive mechanisms, (III) controllers, (IV) workpieces, (V) workpiece processors, (VI) supports and guide structures, (VII) system operation, and (VIII) examples.

I. Rails and Stops

The systems of the present teachings may include a workpiece engagement structure termed a rail assembly or rail. The rail assembly and/or portions thereof may be mechanically coupled to a driver for driven axial motion of the rail assembly (and/or portions, such as stops). Furthermore, the rail assembly may be configured to facilitate positioning workpieces longitudinally, generally parallel to a long axis of the rail assembly, and/or at a predefined lateral location relative to the rail assembly. The rail assembly may have any suitable structure consistent with its intended function. Generally, the rail assembly includes a plurality of stops coupled to a frame.

A stop, as used herein, generally includes any physical structure capable of extending laterally to the frame and configured to engage an end of a workpiece, to restrict axial movement of the workpiece. A stop thus may be or include a block, a bar, a rod, a screen, a plate, and/or the like. In some embodiments, the stop may be replaced by a visible index that allows manually positioning a workpiece by sight rather than by engagement.

The stop may be fixed or movable in relation to the frame. A movable stop may be capable of any suitable translational and/or pivotal movement. Suitable translational movement may translate the stop parallel to the long axis of the frame (e.g., a stop that is movable and then fixable axially along the frame) and/or transverse to the long axis of the frame (e.g., a stop that translates upward, downward, inward (away from the user), and/or outward (toward the user)). Suitable pivotal movement may pivot the stop about an axis parallel to the long axis of the frame (e.g., see Example 1) and/or about an axis transverse to-the long axis of the frame (e.g., see Example 2). Furthermore, the stop may pivot upward (for example, generally toward the top of the frame), downward (e.g., toward the bottom of the frame), and/or laterally (e.g., toward and/or away from the frame).

Movement of the stop may position the stop between an extended configuration and a retracted configuration. The retracted configuration may be flush with the frame, such that a workpiece engages the frame, and/or may project from the frame, such that a workpiece is spaced from the frame by contact with the stop. The stop may be configured to be urged to the retracted configuration by engagement with a workpiece (e.g., a workpiece engaging the stop from a vertical position and/or moving horizontally toward the frame, among others). The stop also or alternatively may be configured to be urged to the retracted configuration manually, that is, with a user's hand(s). For example, the stop may be structured to be gripped and pivoted out of the extended configuration. The stop may be biased toward the extended or retracted configuration. A biasing mechanism, such as a spring (e.g., a coil spring, a leaf spring, an air spring, etc.) may be coupled to the stop, such that, for example, the spring returns to the extended configuration after a retracting force is removed.

In some examples, the stop may be coupled to a driver that drives movement of the stop to the extended and/or retracted configurations. Accordingly, movement of the stops relative to the frame may be controlled by the controller, to automate stop extension/retraction.

In some examples, the extended and retracted configuration of each stop may be sensed by a sensor. The sensor may be, for example, a mechanical, magnetic, electric, and/or optical sensor. The sensor may be arranged in communication with a controller of the system, thereby allowing the controller to determine which stop(s) is retracted and which stop(s) is extended at a given time. Accordingly, the controller may use this information about stop configurations to determine, for example, if a user has positioned a workpiece properly (i.e., selected the proper stop for engagement with the end of a workpiece) and/or to inform the controller of the stop selected by the user (and thus the stop for which subsequent driver movement, if any, should be calculated).

The stop may include a detent mechanism that retains the stop in an extended and/or retracted configuration. The detent mechanism may include, for example, a projection that fits into a depression, a movable pin received in a hole, a threaded fastener mechanism, and/or the like.

A rail assembly may have any suitable number of stops. Generally, the rail assembly has at least two, three, or four stops. However, in some embodiments, the rail assembly may have only one stop. The number may be adjustable, for example, by extending the frame by addition of one more additional frame modules and associated stop(s) and/or by addition (or removal) of a stop to (or from) a frame without changing the frame's length.

The stops may have any suitable arrangement along a frame. The stops may have a uniform or nonuniform spacing between adjacent stops of an array. In addition, the stops may be disposed at opposing ends of the frame, at only one end (e.g., the end farther from the workpiece processor (if performing single-ended processing), and/or at any suitable intermediate positions. Furthermore, a stop may be disposed generally between frame sections, for example, at a joint between the sections, and/or intermediate to the ends of a frame section. If intermediate, the section may have one, two, or more intermediate stops. The stops may be arranged or arrangeable in an array, for coupled motion driven by a drive mechanism and/or may be movable independently and selectively by the drive mechanism parallel to the positioning axis.

The stops may be distinguishable visually to enable a user to select an appropriate stop for abutment with a workpiece. For example, the stops may have distinct associated indicia (e.g., distinct colors, shapes, symbols, alphanumeric characters, textures, etc.) to allow easy identification of each stop. In some embodiments, the stops may have associated lights that are operated by the controller to indicate which stop is to be used for positioning a workpiece. In some embodiments, the indicia may be provided by a frame section adjacent each stop. However, in some examples, the stops and/or frame sections may lack indicia, so that the user identifies and distinguishes the stops according to their relative positions along the rail assembly (e.g., by counting).

The frame may have any suitable number and arrangement of frame sections. The frame may have a single frame section or a plurality of frame sections that couple to one another. The frame sections may be at least approximately of the same length and/or may have different lengths. Furthermore, the frame sections may be structured as modules that can be assembled in various numbers and/or combinations to create frames of different lengths and/or with different stop positions and/or spacings. Each section/module may include one or more stops or may have no stops.

The frame sections may couple to one another by any suitable coupling. The coupling may be relatively permanent such that the sections are intended to remain assembled. Alternatively, the coupling may be intended to be uncoupled partially (e.g., see Example 3) or completely (e.g., see Example 1) between uses, if desired, to allow the system to assume a more compact (less extended) configuration, such as to be transported more readily to/from a worksite or for placement into storage. Partial uncoupling may change the axial and/or angular disposition of frame sections with or without completely separating the sections. Complete uncoupling may allow the sections to be separated completely. Exemplary coupling structures may include complementary mating structure, fasteners, a snap fit, a telescoping arranged, a hinged (folding) arrangement, etc.

Further aspects of stop structures, rails, and multi-stop arrangements along the rails that may be suitable for the processing systems of the present teachings are described in the patents and patent applications identified above in the Cross-References, which are incorporated herein by reference, particularly U.S. Pat. Nos. 4,901,992; and 6,216,574.

II. Drive Mechanisms

The gauge systems of the present teachings each may include any suitable number of drive mechanisms. Each drive mechanism may be configured to move the rail assembly (and/or portions thereof, such as the stops), workpieces, workpiece products, a processing station(s), a processing element of a processing station, and/or the like. Drive mechanisms may be configured to move the rail assembly, stops, workpieces, products, stations, and/or station elements translationally and/or pivotally, among others.

Operation of all or a subset of the drive mechanisms of a gauge system may be controlled by a controller (e.g., a computer) and/or a user. A controller thus may control when a drive mechanism is actuated (movement starts), de-actuated (movement stops), the speed of the drive mechanism, acceleration of the drive mechanism, the direction of motion of the drive mechanism, and/or the like. The drive mechanism may include an encoder that informs the controller of the position, speed, velocity, and/or acceleration, among others, of the drive mechanism. In some examples, one or more of the drive mechanisms may be user controlled, such as by operation of a switch or other user control.

Each drive mechanism may include a motor and a mechanical linkage that couples operation of the motor to movement of a load. The load may include a carriage and a rail assembly (e.g., see Example 1), a portion or all of a processing station, a set of stops, an individual stop, a workpiece, and/or a product, among others.

Any suitable motor(s) may be used in the drive mechanism. Each motor may be an AC or DC electric motor, or may be air- (or gas-) powered, among others. Exemplary motors may be single or multiphase, universal, servo, induction, synchronous, stepper, and/or gear motors, among others. Each motor may be rotary or linear.

The drive mechanism may employ any suitable linkage to a load. Exemplary linkages may include a belt(s), a screw(s), a gear(s) (e.g., a worm gear), a chain(s), a cable(s), a pulley(s), a rod(s), a rack and pinion, and/or the like. The linkage also may include a guide structure or track that directs and/or facilitates sliding movement of the load. Accordingly, the guide structure or track may include bearings or other elements that promote sliding.

Workpieces may be moved manually within the gauge systems of the present teachings and/or their movement may be driven. In some embodiments, workpieces may be driven along and/or transverse to a positioning axis by a workpiece drive mechanism. The workpiece drive mechanism may be configured to engage any suitable surface of a workpiece, such as a trailing end (as when a stop acts as part of a pusher mechanism) to push the workpiece, a face or side (e.g., using a conveyor belt or conveyor wheels, among others) to carry or propel the workpiece, and/or a leading end region, to pull the workpiece.

In some embodiments, the processing systems may include a drag mechanism that affects the speed or acceleration/deceleration of a workpiece. Further aspects of drag mechanisms that may be suitable are described in U.S. patent application Ser. No. 11/140,541, which is incorporated herein by reference.

Processed workpieces (products) may be moved away from processing stations by any suitable drive mechanism(s), such as manually or via driven movement. In some examples, the workpiece drive mechanism also may be used to push workpiece products through an outfeed site after their processing is complete. Alternatively, or in addition, products may be moved actively by a distinct product drive mechanism. The product drive mechanism may include a conveyor, for example, to carry the products farther, generally along the positioning axis, to move the products forward beyond the processing station(s) and/or in a reverse direction along the axis. In some examples, the product drive mechanism may include a pusher mechanism that engages a side of each product and pushes it transverse to the positioning axis, for example, down a ramp and/or onto a conveyor. Further aspects of a return conveyor that may be suitable for the gauge systems of the present teachings are described in the patents and patent applications listed above in the Cross-References, which are incorporated herein by reference, particularly U.S. Pat. No. 7,168,353.

A processing portion of a processing station may be moved manually and/or by any suitable drive mechanism. For example, processing stations may include drive mechanisms that move processing portions of the stations relative to workpieces, such as into engagement with the workpieces or into suitable proximity to the workpieces. The drive mechanisms thus may be operated, generally by computer control, to help position processing sites on a workpiece and/or to conduct processing. In some examples, processing stations, such as fixed printheads that print on workpieces, may lack a drive mechanism so that they are stationary during operation.

A processing station may use distinct drive mechanisms for driving a processing element in its basic operating motion (e.g., rotating a circular saw blade) and for driving processing of the element with the processing element (e.g., moving the rotating circular saw blade through a workpiece). Each of these drive mechanism may or may not be computer controlled.

The systems of the present teachings may include a retention mechanism, such as a clamp mechanism or a clip that holds a workpiece in place as it is being processed by a processing station and/or moved by a drive mechanism. The clamp mechanism and/or clip may be operated manually. Alternatively, or in addition, the clamp mechanism may include a clamp member (or members) coupled to a drive mechanism, so that the clamp member can be moved into engagement with the workpiece to effect clamping, for example, when the workpiece is not moving, and can be moved out of engagement with the workpiece to permit movement of the workpiece by the workpiece drive mechanism. Operation of the clamp drive mechanism may be under computer control (i.e., automated).

III. Controllers

The gauge systems of the present teaching may include a controller(s) that controls operation of the system. The controller may, for example, receive input signals, process the input signals, provide output signals, interact with users, store information, control drive mechanisms (and/or other devices), and/or the like. The controller, which may be a computer, may automate any suitable aspects of a gauge system.

Figure 6:
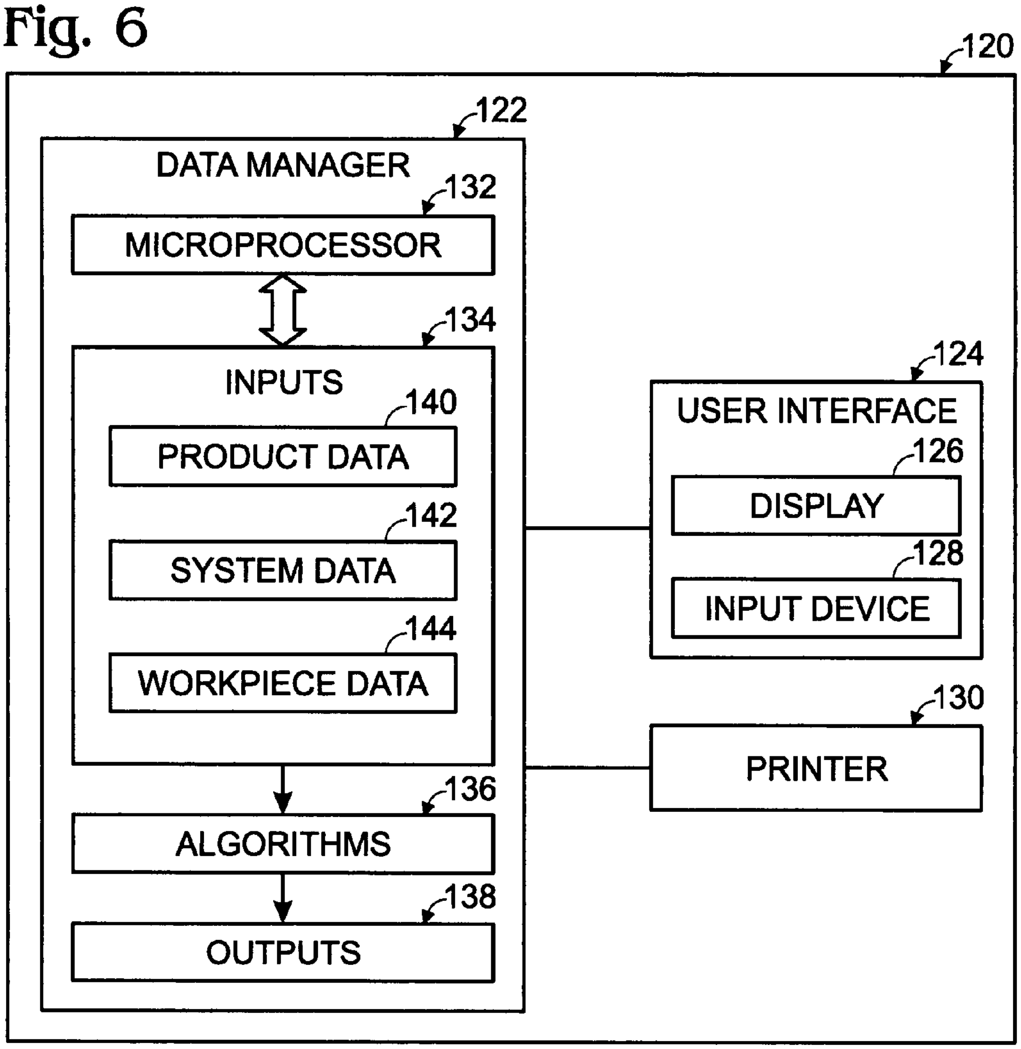
FIG. 6 is a schematic view of an exemplary controller that may be included in the gauge systems of the present teachings.

FIG. 6 shows a schematic representation of an exemplary controller 120 that may be included in an exemplary gauge system. Controller 120 may include a data manager 122 operatively coupled to a user interface 124 (including, for example, a display 126 and an input device(s) 128). Exemplary input devices may include touch controls (e.g., a keyboard, keypad, buttons, a touchscreen, etc.), a joystick, a mouse, a reader for reading data from a digital storage device, and/or the like. The data manager also may be operatively coupled to a printer 130. The printer may print any suitable data, such as a record of inputted, outputted, and/or product data. In some embodiments, the printer may be a label printer to print labels for workpiece products and/or may print directly onto workpieces and/or products. Further aspects of printing labels and printing directly onto workpieces are described in the patents and patent applications identified above, in the Cross-References, which are incorporated herein by reference, particularly U.S. Pat. Nos. 6,886,462, and 7,171,738.

A data manager, as used herein, generally comprises any device capable of receiving, processing, and outputting data, generally in the form of electrical, magnetic, and/or optical signals. Accordingly, the data manager may include a microprocessor 132, a bus, memory, input/output ports, and/or processing instructions (e.g., hardware, firmware, and/or software), among others. The data manager may receive inputs 134, and may operate on the inputs via the microprocessor using one or more algorithms or applications 136, to provide various outputs 138. The inputs may, for example, relate to product data 140, system data 142, and/or workpiece data 144, among others. The outputs may, for example, relate to a stop selected and indicated, information presented on the display, information printed by the printer, control signals sent to drive mechanism(s), and/or the like. Further aspects of a customizable data manager that permits, for example, updating a processing list via a user interface, is described in U.S. Provisional Patent Application Ser No. 60/839,661.

Any suitable product data 140 may be inputted about one or more desired products to provide a product list. The product data may correspond to the length of each desired product and, optionally, the absolute or relative number desired of each product (a cut list); type(s) of processing to be performed in formation of each product; a position(s) where processing should be performed for each product (e.g., relative to a leading and/or trailing end of a workpiece); order of processing operations for each product; etc. The product data also may relate to a particular product to be formed, for example, to allow a user to select the order of products to be formed, such as one-by-one after each product is formed or after a set or products is formed. In some examples, the product data may correspond to a destination for the product, such as a bin or chute, among others, to which the product should be directed automatically, so that products are sorted after processing. Further aspects of sorting products and salvage procedures that may be suitable are described in the patents and patent applications identified above in the Cross-References, which are incorporated herein by reference, particularly U.S. Pat. Nos. 6,941,864; and 7,168,353.

In some embodiments, the controller or a data input device thereof, may be separated (and/or disconnected) temporarily from other portions of a processing system, such as to allow a user to carry the controller or data input device around a work site to input measurements. Accordingly, the controller and/or data input device may include a measuring mechanism, such as an optical (e.g., laser-based) measuring device. Further aspects of remote measurement are described in U.S. patent application Ser. No. 10/897,997, which is incorporated herein by reference.

Any suitable system data 142 may be inputted about how a gauge system is to operate. The system data may include, for example, calibration data related to the measured distance between one or more stops and a processing site defined by a processing station. In some examples, the calibration data may be for only one stop if the spacing between stops is predefined accurately. The system data also may include, for example, the configuration of the rail assembly (e.g., the number and/or type of frame sections included in the rail assembly), the position of stops, the spacing between stops, the number of stops, a selected speed of the drive mechanism, user preferences about how the controller is to interact with the user and/or conduct processing, and/or the like.

Any suitable workpiece data 144 may be inputted. The data may relate to the type of workpiece, one or more characteristic dimensions (e.g., the length, width, and/or thickness, among others) of the workpiece, grade of workpiece material (e.g., high grade, medium grade, low grade, etc.), composition, shape, defect data (e.g., a defect position(s) along the workpiece, degree of defect, etc.), color, and/or the like. Further aspects of inputting defect data and using the defect data to calculate an optimum plan for workpiece processing are described in the patents and patent applications identified above in the Cross-References, which are incorporated herein by reference, particularly U.S. Pat. Nos. 5,042,341; 5,960,104; 6,631,006; and U.S. patent application Ser. No. 10/645,827.

Workpiece data 144 may be inputted through the action of a person (e.g., a current user of the system) and/or automatically. Accordingly, the workpiece data may be inputted through a computer interface, such as a graphical user interface, a keyboard, a keypad, a memory port, a network connection, etc. Alternatively, or in addition, the workpiece data, particularly one or more characteristic dimensions and/or defect data about of the workpiece, may be input through a controller-linked measuring device. The measuring device may include an optical measuring device. Alternatively, or in addition, the measuring device may be an encoder-based measuring device that an operator can slide parallel to the length of a workpiece and selectively actuate, for example, by pushing a button, to send information about the relative position of the workpiece ends, one or more defects, and/or other workpiece features to the controller. Exemplary measuring devices that may be suitable for use in the processing systems of the present teachings are described in the patents and patent applications identified above in the Cross-References, which are incorporated herein by reference, particularly U.S. Pat. Nos. 6,631,006; 6,898,478; and U.S. patent application Ser. No. 10/645,827.

Any suitable algorithms may be used to determine outputs. In some examples, an optimizing algorithm may be used by the controller to calculate an optimal plan for processing each workpiece. The optimizing algorithm may, for example, compare the total length of a current workpiece, and/or the clear length(s) if defects are considered, to a product list, such as a cut list, to determine the best use of the current workpiece in accordance with the cut list (and, optionally, which cut list products are produced). In other words, the algorithm may select processing positions (e.g., sawing positions) such that the processing system partially satisfies a processing list (e.g. a cut list) with each processing operation. Further aspects of optimization and algorithms that may be suitable for optimization are described in the patents and patent applications identified above in the Cross-References, which are incorporated herein by reference, particularly U.S. Pat. Nos. 4,596,172; and 5,444,635.

Whether or not the controller is informed of the length of a workpiece and/or the accuracy with which this information is conveyed may depend upon how the gauge system is processing the workpiece. In some examples, the gauge system may process a workpiece according to the position of the leading end of the workpiece (generally, the opposing end not engaged with a stop). Alternatively, the user may input no data regarding the size of a workpiece to be processed. For example, the user may input product data or select a product to be produced and the controller may assume that the user has a workpiece of sufficient length. In some examples, the user may input a length characteristic of stock workpieces being used. Further aspects of optimization and algorithms that may be suitable are described above in the patents and patent applications identified above in the Cross-References, which are incorporated herein by reference, particularly U.S. Pat. Nos. 4,596,172; 5,444,635; 7,171,738; and U.S. patent application Ser. No. 10/645,827.

IV. Workpieces

The gauge systems of the present teachings may facilitate processing workpieces. A workpiece, as used herein, is any piece of material that will be, or is being, positioned for processing. Accordingly, a workpiece may be in a raw or "unprocessed" form (before any processing by a system), in a partially processed form (during and/or after partial processing by the system), or in a fully processed form (after processing of the workpiece by the system has been completed and/or the workpiece has passed through the system). Each processing station of a system thus may process the raw form of the workpiece, a partially processed form of the workpiece (such as a workpiece cut into smaller pieces or segments (a segmented form of the workpiece) and/or modified otherwise), or both. The processed form of a workpiece, as used herein, is termed a workpiece product or product. Although processed by a first pass through the system, a product may be processed additionally outside the system or during a second pass through the system.

A workpiece may have any suitable composition. Workpieces thus may be formed of wood, metal, plastic, fabric, cardboard, paper, glass, ceramic, or a combination thereof, among others. The composition may be generally uniform or may vary in different regions of a workpiece (e.g., a workpiece with a wood body and a vinyl coating). Exemplary workpieces are wood products, for example, sawn lumber, wood laminates, wood composites, etc. Other exemplary workpieces are metal sheets or strips.

A workpiece may have any suitable shape and size. Generally, the workpiece is elongate, so that the workpiece can be positioned and processed relative to a positioning axis that is parallel to the long axis of the workpiece. However, in some embodiments, the workpiece may not be elongate and/or may not be oriented so that the long axis of the workpiece is parallel to the positioning axis. The workpiece may have any suitable length. Exemplary lengths are based on available lengths of stock pieces, such as stock lumber of about two feet to twenty feet in length, for the purpose of illustration. In some examples, the workpiece may have a rectangular cross section, opposing ends, sides, and faces. One or both ends may be square or oblique (angled/beveled). Furthermore, the sides and faces may be planar or nonplanar.

A workpiece may be of generic stock or may be preprocessed according to a particular application, before processing with a gauge system. For example, the workpiece may be a standard piece of raw lumber. Alternatively, the workpiece, before processing by the gauge system, may include one or more holes, grooves, ridges, surface coatings, markings, etc., created, for example, based on desired features of products to be formed by the gauge system. Further aspects of workpieces that may be suitable are described in the patents and patent applications identified above in the Cross-References, which are incorporated herein by reference, particularly U.S. Pat. Nos. 6,631,006; 7,080,431; and 7,171,738.

V. Workpiece Processors

The gauge systems of the present teachings each may include no workpiece processors, or may include one, two, or more workpiece processors, generally creating processing stations for processing workpieces. The term "processing," as used herein, can be any action or set of actions that result in structural modification of a workpiece. A structural modification is any change in the shape, size, a surface aspect, and/or other property of a workpiece, for example, by removing material from the workpiece, adding material to the workpiece, deforming the workpiece, and/or changing the molecular structure of the workpiece, among others. Accordingly, a processing station is any portion of a gauge system that can effect processing of a workpiece. Each processing station generally includes a machine or set of machines configured to perform a processing operation, and an associated space in which the processing can be performed on a workpiece. A system with two or more processing stations may include distinct processing stations that perform two or more different types of processing operations and/or that can perform the same type of processing operation at different positions (for example, at the same time).

A processing station may include a processing element that engages a workpiece and/or ejects a material or projectile toward the workpiece. Exemplary processing elements that engage a workpiece may include a blade, a drill bit, a router bit, a pen, a tip, a scribe, a brush, etc. Exemplary processing elements that eject (or fire) a material or projectile toward the workpiece, with, or more generally without contact between the workpiece and the processing elements, may include a printhead, a sprayer, a dropper, a projectile gun, etc. (Exemplary projectiles may include spacers, fasteners, joint members (e.g., dowels, biscuits, butterfly locks, etc.), and/or the like. Processing elements may have any suitable disposition and/or direction of travel relative to a workpiece. For example, processing elements may be disposed above, below, laterally, and/or adjacent an end of the workpiece (and/or a segment thereof). Furthermore, processing elements may be movable translationally and/or pivotably, in any suitable direction, including downward, upward, transverse, oblique, and/or longitudinal motion, among others, relative to the workpiece. This motion may position the processing element at a suitable position along the length, width, and/or depth of the workpiece, and in some examples (e.g., drilling, sawing, and/or routing, among others), may introduce the processing element into and/or through the workpiece. Accordingly, the processing elements may be configured to process faces, sides, and/or ends of workpieces.

Movement of processing elements, termed processing movement, to dispose the elements in operational position relative to workpieces, may be controlled manually and/or via a controller. Processing elements also may have a basic repetitive operating motion, such as rotation, reciprocation, and/or travel along a looped path, among others, which may be actuated separately by an element driver, and also may be manually or computer controlled.

The processing stations of a gauge system may have any suitable positional, functional, and operational relationship. Two or more of the processing stations may be disposed upstream and downstream of one another, generally along a positioning axis (a processing path) of a gauge system. In some cases, the two or more processing stations generally may flank or oppose the ends of the drive mechanism and/or rail assembly for double-ended processing. Accordingly, the controller may be configured to position a selected stop (and, optionally, one of two opposing engagement surfaces (sides) of the stop) relative to one or the other of the processing stations. Further aspects of double-ended processing are described in the patents and patent applications identified above in the Cross-References, which are incorporated herein by reference, particularly U.S. Pat. No. 7,080,431; and U.S. patent application Ser. No. 11/492,703. Alternatively, or in addition, two or more of the processing stations may have about the same position along the processing path, for example, when the processing stations occupy substantially nonoverlapping positions around the workpiece. The processing stations may have a fixed or adjustable positional relationship relative to one another (and/or to the workpiece), particularly along the processing path of the workpiece. Accordingly, in some examples, the processing stations may be movable to the same position in the processing path. The processing stations may perform processing operations on a workpiece at any suitable relative times. For example, the processing stations may operate in a sequential manner on the same region of the workpiece (e.g., forming a cavity in a region with a first station, and then placing a component in the cavity with a second station), may operate at overlapping times on the workpiece (e.g., cutting a workpiece at a saw station as the workpiece is being drilled at a drill station), and/or may operate at non-overlapping times on the workpiece (e.g., processing a workpiece using a station and during a first time period (or a first set of intervals), while the workpiece is moving, and processing the workpiece using another station and during a second, nonoverlapping time period (or set of nonoverlapping intervals), while the workpiece is not moving). Processing operations performed with two or more processing stations, and workpiece movement, each may be performed manually and/or may be controlled by computer.

A processing station may be configured for removing material from a workpiece, to change the shape, size, and/or a surface aspect of the workpiece. Exemplary processing stations for removing material include a saw station (or another cutting station including a laser, knife, flame, electron beam, etc.) for cutting a workpiece, a router station for routing/milling a workpiece, a scorer station for scoring the surface of a workpiece, a sander station for smoothing the surface of a workpiece, a hole-forming or drill station for forming a hole in a workpiece, a borer station for widening a hole in a workpiece, a shearer station for shearing a workpiece, a deburrer station for deburring a cut end and/or other surface of a workpiece, a V-groove station for cutting a V-groove in a workpiece, a punch station for punching a hole in a workpiece, and/or the like.

A saw station may include any suitable type of saw, saw blade, blade orientation, and blade movement. Exemplary blades may include circular blades, band blades, and/or reciprocating blades, among others. The blades may be configured to perform crosscuts (generally transverse to the length of a workpiece; e.g., chop saws), rip cuts (generally along the length of a workpiece; e.g., rip saws), miter cuts, dado cuts, angle cuts, nonlinear cuts, etc. The saw station thus may include a motor that drives the blade rotationally (e.g., circular saws), around a loop (e.g., band saws), and/or back and forth (e.g., reciprocating saws). The driven saw blade may be configured to be actuated for cutting a workpiece by movement of the driven blade, in any suitable direction relative to a workpiece, including translationally (e.g., a radial arm saw) and or along an arc through pivoting motion (e.g., a chop saw, using an upward and/or downward motion). Further aspects of forming dados that may be suitable for the systems of the present teachings are described in U.S. patent application Ser. No. 10/958,690, which is incorporated herein by reference.

A drill station may include any suitable components and may operate by any suitable direction of approach to a workpiece. The drill station may include a driver and a drill bit rotated by the driver. Positioning of the drill bit may be controlled manually or by computer. This positioning may be parallel to the long axis of the drill bit (to control depth of drilling for through-holes or recesses), and/or transverse to this axis. Accordingly, the depth of drilling may be controlled, to form through-holes or recesses. Also, the transverse, longitudinal, and/or vertical position of hole formation on a workpiece may be controlled, as may the angle of hole formation.

A processing station may be configured to add material to a workpiece, to change the shape, size, and/or a surface aspect of the workpiece. Exemplary processing stations for adding material include a print station for adding one or more surface marks (an indicium or indicia) to a workpiece, a fastener station for adding a fastener to a workpiece (such as a nail, screw, bolt, rivet, bracket, hook, staple, dowel, biscuit, butterfly lock, spline, etc.), a coating station for adding a surface coating or fluid (e.g., paint, varnish, stain, sealant, glue, etc.) to a surface or surface region of a workpiece, a spacer station for adding a spacer element (e.g., a spacer ball, a block, a spline, etc.) to a workpiece, an assembly station that connects (e.g., joins) the workpiece with one or more other components, and/or the like.

A processing station may be configured to change the shape of a workpiece by deformation of the workpiece. Exemplary deformation may include bending, twisting, folding, compression, stamping, and/or the like.

A processing station may be configured to change the molecular structure of a workpiece. Exemplary operations that may be used to change the molecular structure of a workpiece, either globally or locally in the workpiece, may include heating, cooling, exposure to electromagnetic radiation (e.g., visible light, infrared light, radiofrequency waves, microwaves, ultraviolet light, X-rays, gamma-rays, etc.) or particle radiation, soundwaves (sonic or ultrasonic), compression, and/or the like.

Further aspects of processing stations that may be suitable are described in the patents and patent applications identified above in the Cross-References, which are incorporated herein by reference, particularly U.S. Pat. No. 7,171,738; and U.S. patent application Ser. No. 10/958,690.

VI. Supports and Guide Structures

The gauge systems of the present teachings may include various support and/or guide structures that support, guide, and/or facilitate movement of workpieces, processing stations, and/or processing portions of processing stations. For example, the support structures may include a table. The table may be foldable and/or may disassemble to increase the portability of the system. The table may include structures that facilitate and/or guide sliding, such as wheels, bearings, fixed rails/fences, and/or a slider, among others. One or more processing stations and/or a rail assembly may be coupled to the table or to adjacent support structures. Coupled components may be removable readily from the table to increase the portability and storability of the gauge system.

VII. System Operation

The gauge systems of the present teachings may be operated in various combinations of manual and automated modes to process workpieces into products. The modes may include manual or automated stop selection, manual or automated selection of a product to produce from a list of products, manual or automated positioning of a workpiece relative to a stop, manual or driven motion of the workpiece along a positioning axis, manual or automated processing after the workpiece is properly positioned along the positioning axis, manual or automated labeling of a workpiece or product, and/or the like.

VIII. Examples

The following examples describe selected aspects and embodiments of the present teachings, particularly exemplary gauge systems for processing workpieces and components of the gauge systems. These examples and the various features and aspects thereof are included for illustration and are not intended to define or limit the entire scope of the present teachings.

Example 1

Exemplary Gauge System

This example describes an exemplary gauge system 150 including an exemplary driver, rail assembly, and guide for the rail assembly; see FIGS. 7-11.

Figure 7:
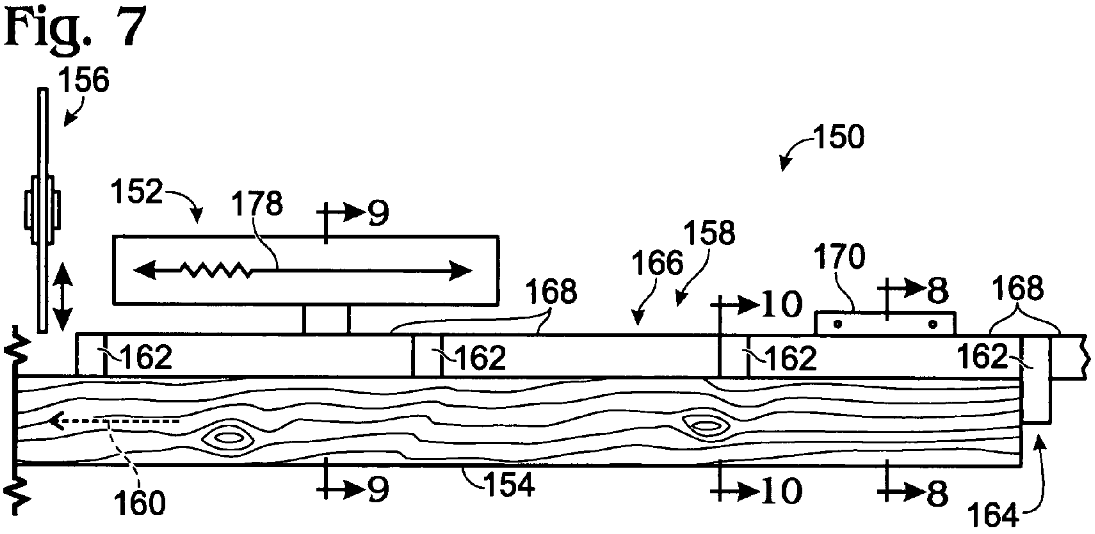
FIG. 7 is a top view of another exemplary gauge system for positioning workpieces to be processed, in accordance with aspects of the present teachings.

FIG. 7 shows a top view of gauge system 150. The system may include a drive mechanism 152 that allows accurate positioning of a workpiece 154 relative to one or more processing stations 156 (here, a saw station). The drive mechanism may be controlled by a controller that operates the drive mechanism and a coupled rail assembly 158, to position the rail assembly along a linear processing path 160. The rail assembly may have a plurality of stops 162, one of which may be selected for engagement with the end of the workpiece (e.g., the selected stop indicated at 164). The workpiece may be driven longitudinally by the drive mechanism (e.g., with the selected stop in engagement with an end of the working and thus acting as a pusher). Alternatively, the workpiece may be positioned manually in engagement with the selected stop, generally after the rail assembly has stopped moving and the selected stop is static.

Rail assembly 158 may include a frame 166 having a plurality of discrete frame component or rail sections 168 disposed between stops 162. The frame may slide along a support, such as a table (see FIGS. 8-10). Accordingly, the frame and/or support may have wheels and/or bearings that facilitate sliding motion. Alternatively, or in addition, the frame may be guided by one or more guides 170 coupled to the support, for example, attached fixedly to the support.

Figure 8:
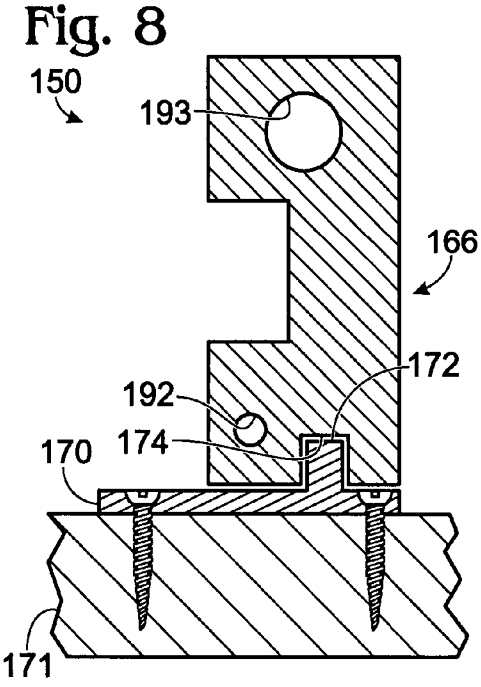
FIG. 8 is a sectional view of a rail and a guide of the gauge system of FIG. 7, taken generally along line 8-8 of FIG. 7.

FIG. 8 shows a sectional view of frame 166 and guide 170 taken generally along line 8-8 of FIG. 7. The guide (or guides) be mounted on a support 171 (here, using fasteners) and may include a guide projection 172 projecting upward from the base or body of the guide. The guide projection may be received in a longitudinal track or groove 174 formed in the underside of the frame and extending at least a portion or all of the length of the frame. The guide projection, which may be static, thus may guide movement of track 174 as the track is moved with the frame. In some examples, the guide (and/or the frame) may include a wheel or bearing(s) to facilitate movement and/or to reduce friction. In other embodiments, the support (e.g., a table) and/or an attachment thereto also may provide a support track (e.g., a ridge or groove) in, on, or over which the frame may ride. The support track may extend any suitable portion of the length of the support and may be continuous or interrupted by one or more breaks in the track.

Figure 9:
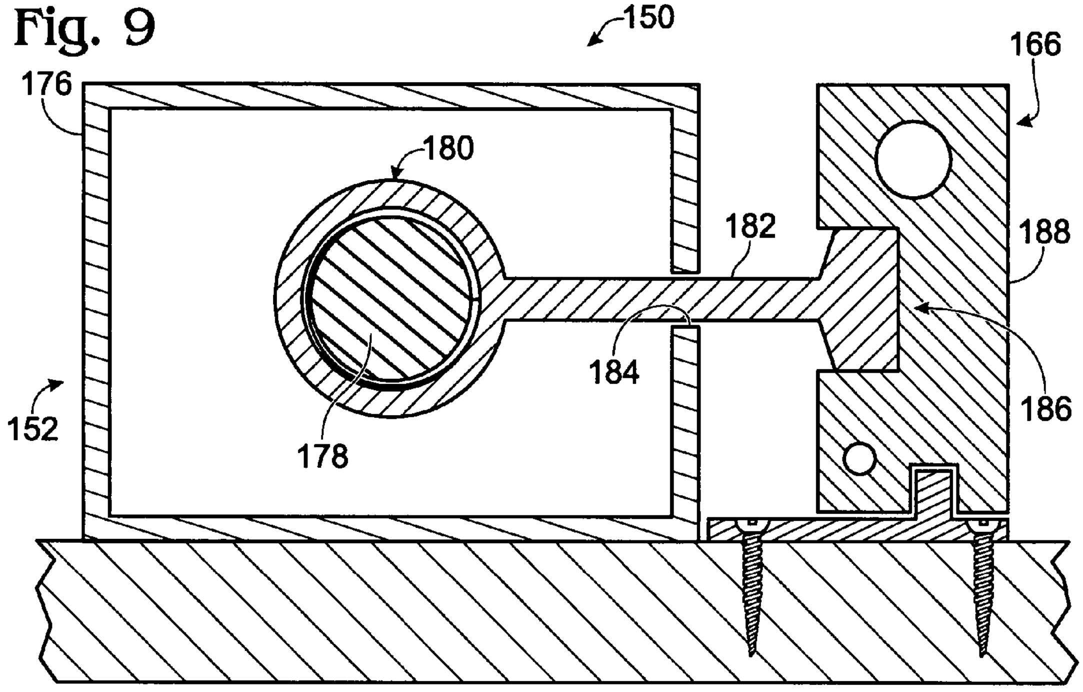
FIG. 9 is a sectional view of a rail and a driver of the gauge system of FIG. 7, taken generally along line 9-9 of FIG. 7.

FIG. 9 shows a sectional view of frame 166 and a screw-based drive mechanism 152 taken generally along line 9-9 of FIG. 7. The drive mechanism may include a housing 176 and a lead screw 178 coupled rotatably to the housing. The drive mechanism also may include an internally threaded carriage 180 coupled to the lead screw for rotation-driven axial motion of the carriage along the lead screw and thus the housing. The carriage may include an arm 182 that extends out of an opening 184 in the housing to frame 166 of the rail assembly. The arm may be attached to the frame, indicated at 186, such that the arm and the frame move together. In some embodiments, the arm may be connectable to the frame alternatively via distinct rail sections and/or via two or more alternative positions along a rail section. In some embodiments, the arm may not attach to the frame, but to a sub-frame carrying the stops. Accordingly, portions of the frame, such as an alignment surface 188 that may engage the side of a workpiece may be static during operation of the drive mechanism.

Figure 10:
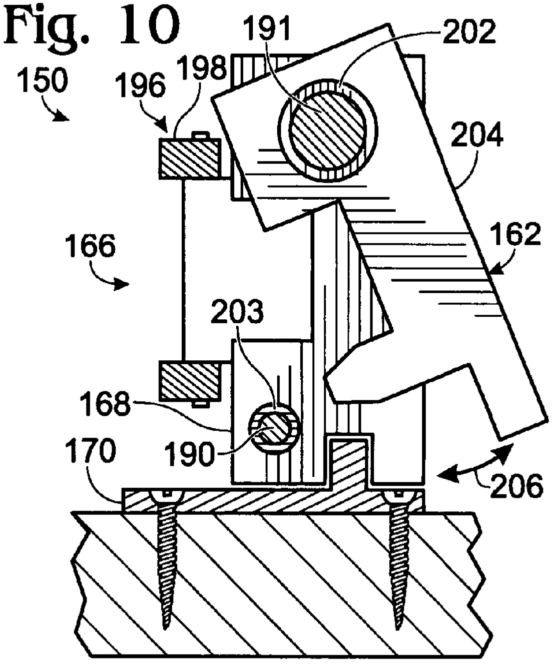
FIG. 10 is a sectional view of a rail of the gauge system of FIG. 7, taken generally along line 10-10 of FIG. 7 adjacent a stop of the rail.
Figure 11:
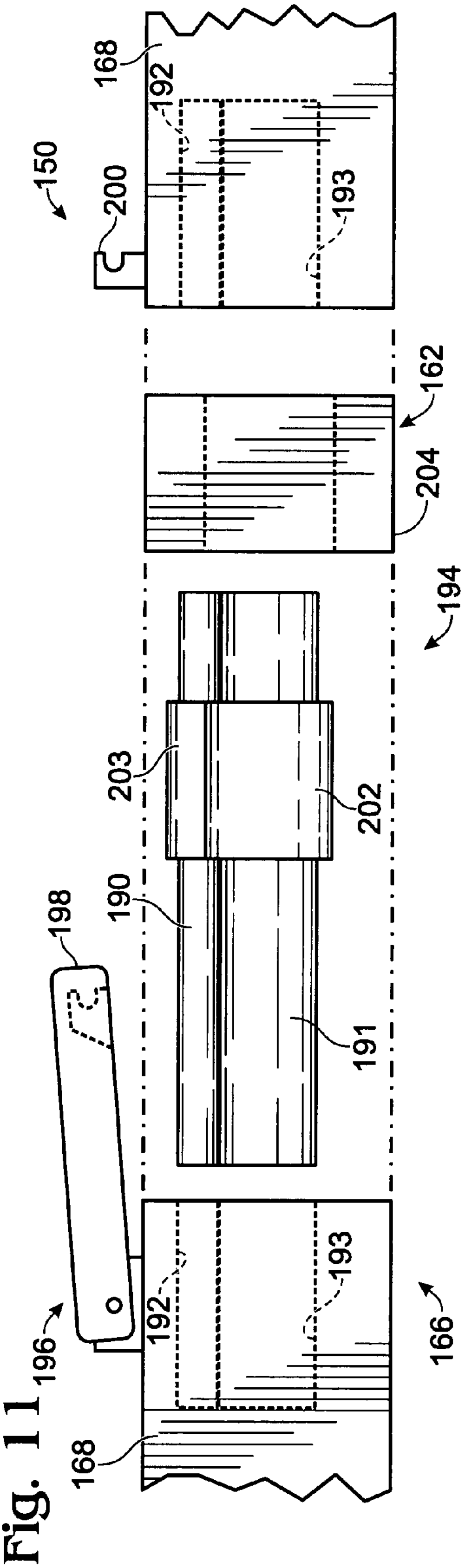
FIG. 11 is a top, exploded view of a joint between rail frame sections of the gauge system of FIG. 7, taken generally at the position of the rail shown in FIG. 10.

FIG. 10 shows a sectional view of frame 166 and stop 162 taken generally along line 10-10 of FIG. 7; FIG. 11 is an exploded view taken from above the frame at about the same position. Frame sections 168 may be coupled to one another via one or more bridge elements, such as rods 190, 191 received in respective holes 192, 193 (see FIGS. 8, 10, and 11) extending into frame sections from the ends thereof to form a joint 194 (see FIG. 11). A lock mechanism 196 may be actuated to restrict uncoupling of the frame sections at the joint. The lock mechanism may, for example, be a latch mechanism including a draw latch 198 on one side of the rail joint and a latch strike 200 on the other side of the joint. In some embodiments, the lock mechanism may be operated manually, such as via a handle connected to the draw latch, to lock and unlock connection of adjacent frame sections.

One or more bushings 202, 203 may serve as spacers and/or stop couplers (see FIGS. 10 and 11). For example, the bushings may be disposed on rods 190, 191 to separate the ends of the frame sections and thus act as spacers. A stop member 204 (forming stop 162) may be received on bushing 202 for pivotal movement about the central axes of the bushing and rod 191. The stop member may be biased pivotally, such as by a coil spring. Accordingly, the stop member may be engaged and pivoted inward (clockwise at 206 in FIG. 10), with an engaging force, and then may spring outward to its extended position when the engaging force is removed.

Example 2

Rail with Stops Adjustable for Beveled Ends of Workpieces

Figure 12:
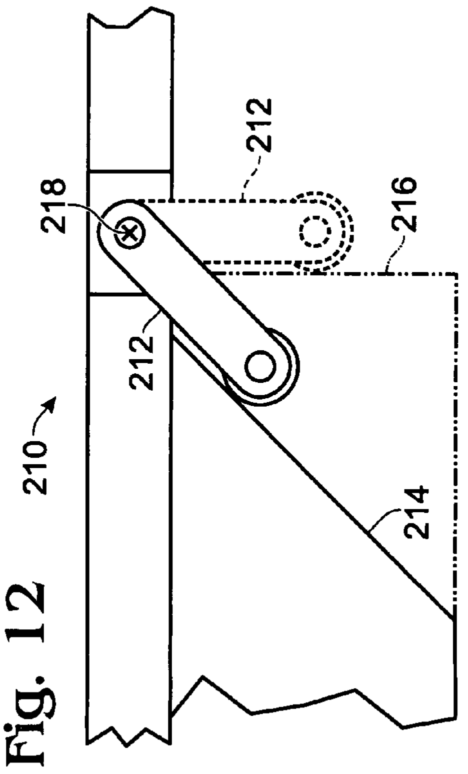
FIG. 12 is a top view of an exemplary rail including a pivotable stop that accommodates workpieces with either a square end or an angled end, in accordance with aspects of the present teachings.

FIG. 12 shows an exemplary rail 210 including a pivotable stop 212 that accommodates workpieces 214 and 216 with ends formed at distinct angles. Stop 212 may be pivotable about a vertical axis 218 and may be biased toward alignment with the frame of the rail assembly (clockwise motion in the present illustration) or may be biased toward an orthogonal disposition relative to the frame. In any event, the stop may be pulled out (e.g., by hand) to various angles to engage workpieces with a beveled end (e.g., workpiece 214) or a square end (e.g., workpiece 216).

Example 3

Exemplary Gauge System with Folding Rail

Figure 13:
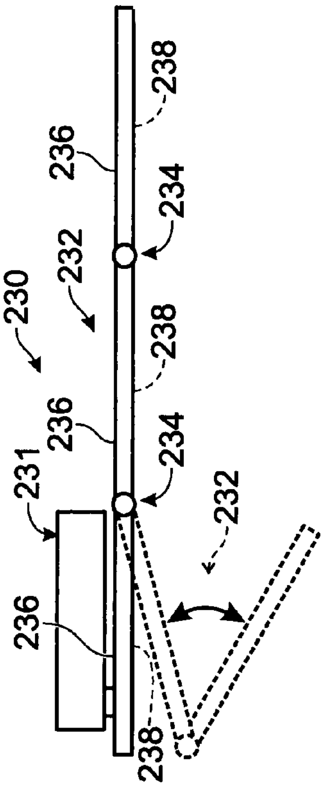
FIG. 13 is a top view of an exemplary gauge system with a folding rail, in accordance with aspects of the present teachings.

FIG. 13 shows an exemplary gauge system 230 with a driver 231 and a folding rail 232 having a hinge mechanism 234 between each adjacent pair of frame sections 236. Stops 238 may be disposed intermediate the hinge mechanisms, as shown here, and/or may have about the same longitudinal positions as the hinge mechanisms.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

We claim:

1. A system for positioning workpieces for processing, comprising:

a driver;

a rail assembly coupled to the driver for driven motion parallel to a positioning axis, the rail assembly including a frame and a plurality of stops arranged along the frame, the stops being movable in relation to the frame such that individual stops can be engaged with an end of a workpiece to position the end at distinct distances from a predefined site along the positioning axis; and a controller that operates the driver for movement of the rail assembly according to inputs that correspond to processing positions along workpieces, wherein the rail assembly has an adjustable length.

2. The system of claim 1, wherein the frame includes a plurality of discrete, elongate frame sections arranged generally end to end when the rail assembly is in an operating configuration.

3. The system of claim 2, wherein a stop is disposed generally between a pair of the frame sections when the rail assembly is in an operating configuration.

4. The system of claim 2, wherein two or more of the frame sections are the same length.

5. The system of claim 2, wherein one or more of the frame sections are configured to be omitted from the frame, if desired, to decrease the length of the rail assembly.

6. The system of claim 2, further comprising at least one additional frame section configured to be added to the frame, if desired, to increase the length of the rail assembly.

7. The system of claim 2, wherein the frame sections are connected to each other such that the frame can be collapsed from an operating configuration to a storage configuration without disconnecting the frame sections from each other.

8. The system of claim 7, wherein adjacent frame sections are connected by a hinge mechanism.

9. The system of claim 1, wherein the controller is configured to receive a signal indicating the length of the rail assembly and to operate the driver based on the length indicated.

10. The system of claim 1, wherein at least a portion of the controller is configured to be separated from the driver and held by hand to allow input to the controller at a work site independent of where the driver is located.

11. The system of claim 10, wherein the at least a portion of the controller includes a measuring mechanism for measuring linear dimensions and a storage mechanism for storing the linear dimensions that are measured.

12. The system of claim 1, wherein the driver includes an encoder that provides feedback information about driver position.

13. The system of claim 1, wherein the driver defines a maximum range of driven travel for the rail assembly, wherein the stops define an array having a length, and wherein the length of the array is at least about twice the maximum range of driven travel.

14. The system of claim 1, wherein the controller is configured to receive inputs corresponding to a list of processing positions along workpieces and to a length of a workpiece to be processed, to calculate an optimum plan for processing the workpiece based on the list and the length, and to control movement of the rail assembly via the driver according to the optimum plan.

15. The system of claim 14, wherein the controller is configured to receive inputs corresponding to one or more defect positions along a workpiece and to calculate an optimum plan for processing the workpiece based in part on the one or more defect positions.

16. A method of processing workpieces with a workpiece processing system including a driver, a rail assembly that couples to the driver for driven motion parallel to a positioning axis, and a controller that operates the driver for movement of the rail assembly, the method comprising:

adjusting the length of the rail assembly to place the rail assembly in an operating configuration in which a plurality of stops are arranged along a frame of the rail assembly and are movable in relation to the frame such that individual stops can be engaged with an end of a workpiece to position the end at distinct distances from a predefined site along the positioning axis; and operating the driver to move the rail assembly according to inputs that correspond to processing positions along workpieces such that one of the stops is disposed at a proper distance from the predefined site when a workpiece is about to be processed at one of the processing positions.

17. The method of claim 16, wherein the step of adjusting the length includes a step of connecting elongate frame sections such that the frame sections are arranged generally end to end.

18. The method of claim 16, wherein the step of adjusting the length includes a step of unfolding the rail assembly from a storage configuration.

19. The method of claim 16, wherein the step of adjusting the length includes a step of telescoping the rail assembly from a storage configuration.

20. The method of claim 16, further comprising a step of receiving inputs corresponding to a list of processing positions along workpieces and to a length of a workpiece to be processed, a step of calculating an optimum plan for processing the workpiece based on the list and the length, and a step of controlling movement of the rail assembly via the driver according to the optimum plan.

21. The method of claim 20, further comprising a step of receiving inputs corresponding to one or more defect positions along the workpiece, and a step of calculating an optimum plan for processing the workpiece based in part on the one or more defect positions. 30

22. The method of claim 16, further comprising a step of sawing the workpiece positioned by the one stop to satisfy an item of a cut list.

23. A system for processing workpieces, comprising:

a table;

a saw mounted to the table and configured to cut workpieces at a site along a positioning axis;

a driver supported by the table;

a rail assembly that couples to the driver for driven motion of the rail assembly as a unit traveling parallel to the positioning axis, the rail assembly including a frame and a plurality of stops arranged along and coupled movably to the frame to allow individual stops to be placed alternately in a deployed position and a retracted position relative to the frame, such that individual stops in a deployed position can be engaged alternatively with an end of a workpiece, with the workpiece aligned with the positioning axis by the rail assembly and supported by the table, to position the end of the workpiece at corresponding distinct distances from the site at which the saw cuts; and a controller that operates the driver for movement of the rail assembly according to inputs that correspond to processing positions along workpieces, wherein the rail assembly has an adjustable length.

* * * * *